United States Patent [19]
Browne

[11] 3,887,224
[45] June 3, 1975

[54] IMPACT ENERGY ABSORBER WITH RADIALLY ADJUSTABLE FLOW METERING
[75] Inventor: Frank H. Browne, Dayton, Ohio
[73] Assignee: General Motors Corporation, Detroit, Mich.
[22] Filed: Apr. 1, 1974
[21] Appl. No.: 456,560

[52] U.S. Cl. .................. 293/85; 188/289; 267/116
[51] Int. Cl. ........................ B60r 19/06; F16f 9/342
[58] Field of Search ............ 293/70, DIG. 2, 85, 86; 188/289; 213/43, 223; 267/64 R, 65 R, 116, 139

[56] References Cited
UNITED STATES PATENTS
2,348,160   5/1944   Thornhill .......................... 267/64 R
3,593,978   7/1971   Lohr ................................. 267/64 R
3,700,273   10/1972  Jackson et al. ..................... 267/139

Primary Examiner—Richard A. Schacher
Assistant Examiner—Robert Saifer
Attorney, Agent, or Firm—Charles R. White

[57] ABSTRACT

This telescoping energy absorber unit has a longitudinally extending and tapered metering rod which is radially adjustable with respect to the axis of the unit so that it can float in alignment with a fixed fluid flow control orifice centrally located between expandable and contractable hydraulic chambers in the unit so that the rod and orifice meter hydraulic fluid between the chambers to absorb the energy of impact forces applied to the unit.

4 Claims, 5 Drawing Figures

PATENTED JUN 3 1975 3,887,224

SHEET 1

IMPACT ENERGY ABSORBER WITH RADIALLY ADJUSTABLE FLOW METERING

This invention relates to energy absorber units mounting a bumper to a vehicle frame and more particularly to a new and improved telescoping energy absorber having floating fluid metering rod construction that is radially adjustable for alignment with a cooperating flow control orifice for metering the flow of fluid between fluid chambers as the absorber telescopes in response to impact of the bumper.

Hydraulic energy absorber units prior to the present invention have employed fixed, longitudinally-extending, metallic metering rods which are centrally welded to an end cap of the unit and which extend into associated oil flow control orifices to meter fluid between oil pressure chambers to absorb impact energy. To compensate for manufacturing tolerance variation which could result in an axial misalignment of the centrally fixed metering rod and orifice, prior art units have featured radially adjustable orifices. While such constructions have adequately compensated for the metering rod and orifice misalignment their construction is relatively complex and expensive and requires the metering rod to be welded or otherwise fixed to the unit.

This invention provides a new and improved energy absorber unit in which the metering rod is preferably a lightweight molded plastic member and is radially movable relative to a fixed orifice. With this invention the number of components, weight and cost are substantially reduced as compared to the prior art devices. In a first embodiment of this invention an annular disc member is employed as a weld flash shield and as a means for retaining the radially adjustable metering rod in position in the unit. In a second embodiment of the invention the metering rod is a hollow member extending longitudinally in the unit supported at one end by an integral disc-like base which has a thin walled portion with concentric corrugations that flexes to provide for the radial adjustment of the extending rod relative to a fixed orifice. In addition to yieldably mounting the metering rod for radial adjustment the flexible base further serves as a weld flash shield for the unit.

In addition to these advantages, features and objects this invention eliminates adjustable orifices of the prior units, the need for welding and metering rod to the unit, facilitates assembly of the unit and makes additional use of flash shield construction while increasing unit design flexibility.

These and other features, objects and advantages of this invention will be more apparent from the following detailed description and drawings in which.

Figure 1:
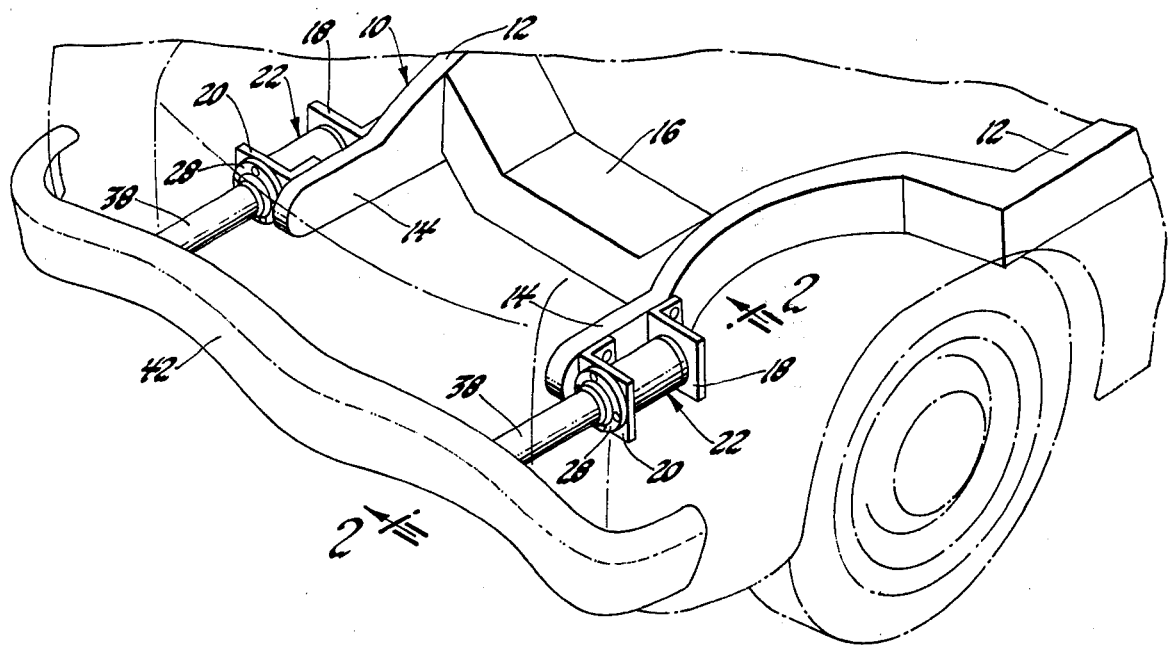
FIG. 1 is a perspective view of an automotive vehicle chassis frame and energy absorber units mounting a bumper assembly to the frame.

Referring now particularly to FIG. 1 of the drawings, there is a chassis frame 10 comprising a laterally spaced pair of side rails 12 having forwardly extending horn portions 14 interconnected by a front cross member 16. Bolted to each horn portion 14 is a pair of L-shaped brackets 18 and 20 which are longitudinally spaced from each other that connect spaced energy absorber units 22 to the chassis frame 10. Each energy absorber unit 22 extends through a circular opening in its associated outermost bracket 20 and has an outer cylinder 24 welded at 26 to a collar 28. The collar 28 is in turn bolted or otherwise rigidly secured to the bracket 20. The outer cylinder 24 is closed by an end cap 30 secured to the cylinder by annular weld 31. End cap 30 has a central threaded stud 32 rigidly fixed thereto which projects outwardly through an opening 34 in bracket 18. Nut 36 threaded onto stud 32 rigidly secures the end cap 30 and thus the outer cylinder 24 to bracket 18.

In addition to the outer cylinder 24, each energy absorber unit 22 comprises an inner cylinder 38 which is mounted for limited telescoping movement within cylinder 24 and which projects forwardly therefrom. The forward end of the inner cylinder 38 is closed by a base plate 40 welded thereto which is adapted to be secured to a bumper assembly 42 by suitable fastener means, not illustrated. A flash shield 43 prevents weld flash entry into the interior of cylinder 38. Secured to the inner or rearward end of each inner cylinder 38 is a cap 44 that provides intermediate and rear fluid chambers 46 and 48 each of which is filled with a suitable hydraulic fluid such as oil. A thin wall cylindrical bearing member 50 of a suitable material such as glass-filled nylon is mounted over the cylinder cap 44 to slidably fit the inner diameter of the outer cylinder 24. There is, however, sufficient clearance between the bearing sleeve member 50 and the inner wall of cylinder 24 so that chamber 48 is in direct hydraulic communication with the inner space 52 formed between the outer and inner cylinders.

Disposed within inner cylinder 38 is a floating sheet metal piston 54 fitted with an O-ring 56 that separates chamber 46 from a front chamber 58 formed between floating piston 54 and the base plate 40. A quantity of gas is compressed in chamber 58 being injected through an orifice 60 formed in the base plate which is subsequently sealed by a ball 62 welded therein. The force of gas compressed within chamber 58 urges the cylinders 38 and 24 to the normally extended position shown in FIG. 2.

The bearing member 50 is cylindrical in shape and has an outer peripheral portion hooked around the circumferential outer edge of cap 44 and an inner peripheral portion extending radially inwardly partially covering the front face of the cap 44. Cap 44 is formed with a centralized annular flow control orifice 68 providing a fluid passage between chambers 46 and 48.

The flow control orifice 68 cooperates with an axially extending tapered metering rod 70 which projects into the orifice and coacts therewith to control the flow of fluid between chambers 46 and 48 in response to the telescoping movement of the two cylinders 38 and 24 when the front bumper assembly is impacted and moved axially and with respect to the chassis frame 10. The metering rod of this embodiment of the invention is a solid tapered member molded from a suitable plastic material which has an integral annular base 72 that has a diameter less than the diameter of the outer cylinder 24 so that it is adjustable in any radial direction so that rod 70 can be aligned with the orifice element 68. The base member 72 is disposed between a flash shield 76 secured to the outer cylinder 24 and the end cap 30. As shown, the flash shield 76 has an enlarged central opening 78 through which the metering rod extends. The sizing of base 72 and the central opening 78, and the clearance provided between the flash shield 76 and the end cap 30 is sufficient to permit movement of the metering rod 70 in any radial direction from a normal central position for alignment with the orifice 68. With the rod 70 floating radially, operation of the unit is improved since the rod automatically adjusts as the inner cylinder strokes into the outer cylinder without any binding or significant wear.

Figure 2:
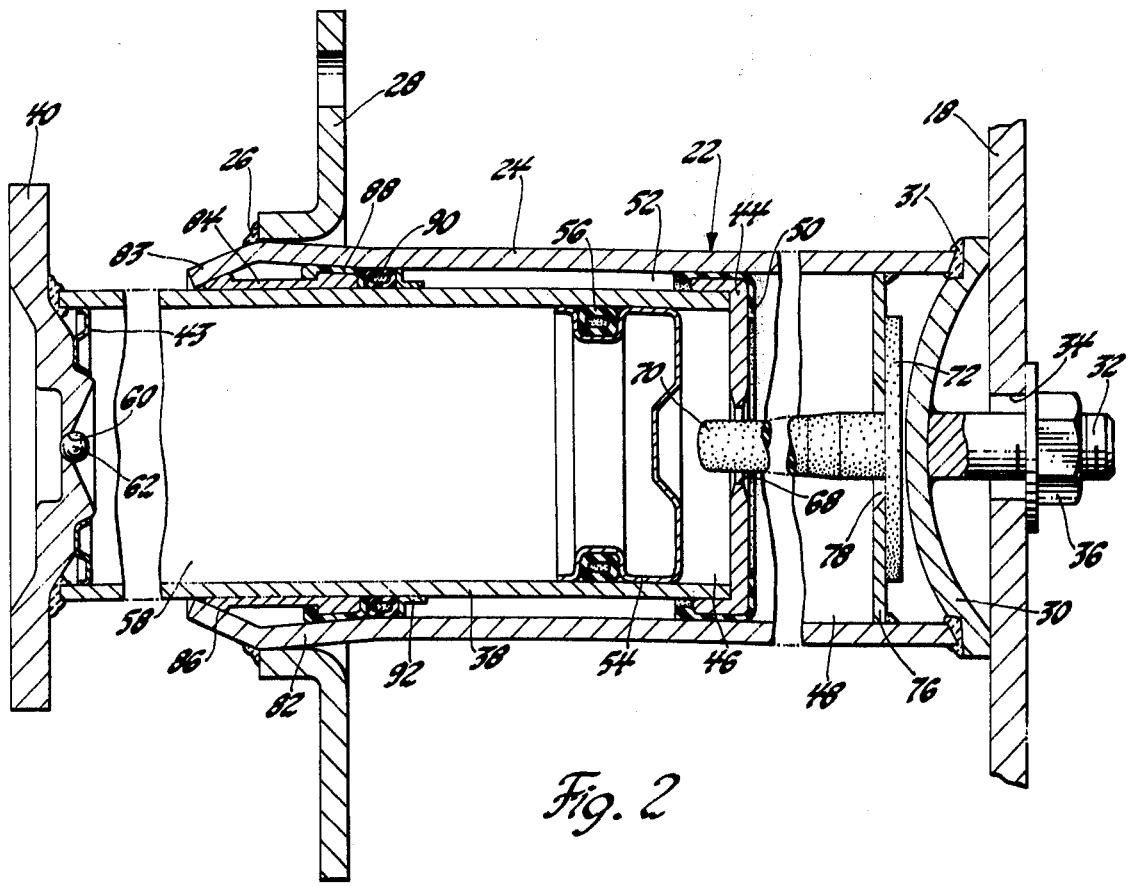
FIG. 2 is an enlarged cross-sectional view taken generally along the plane indicated by lines 2—2 of FIG. 1 showing the energy absorber unit in its normal extended position.
Figure 3:
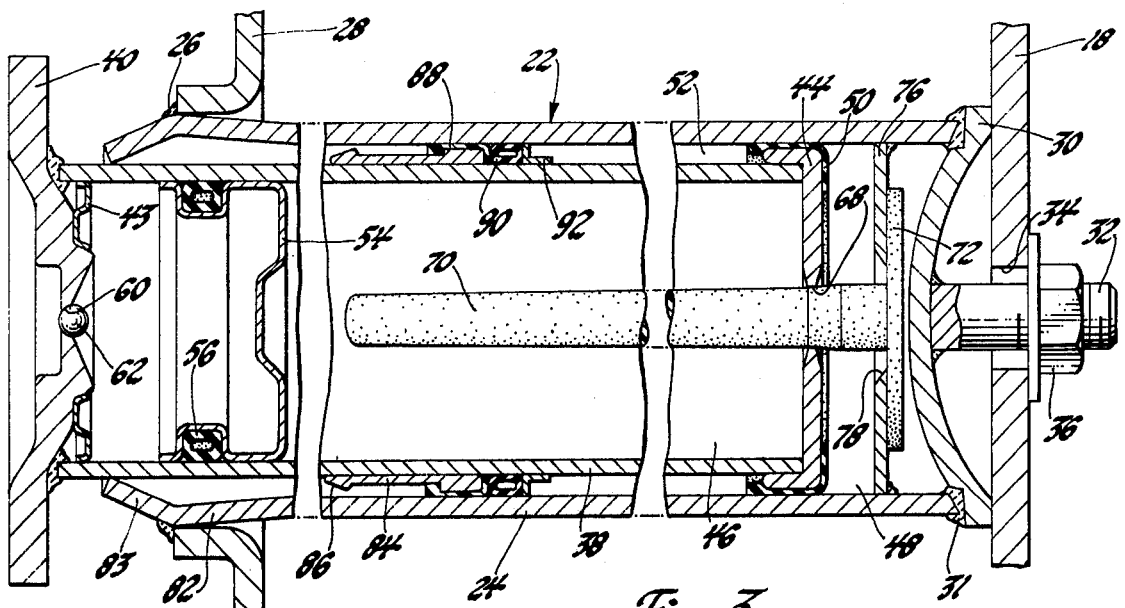
FIG. 3 is a view similar to the view of FIG. 2, showing the energy absorber unit of FIG. 2 in a retracted position.

As shown in FIG. 2, the end of cylinder 24 is bulged at 82 and is provided with an inwardly tapering wall 83. An annular bearing and stabilizing sleeve 84 of steel or other suitable material is welded to cylinder 38 and has at its forward extremity a tapering head 86 which snugly engages the tapering wall 83 to prevent radial play between the two cylinders in their extended position and to form a stop for the cylinders when expanding from the FIG. 3 to the FIG. 2 position. The bearing and stabilizing sleeve 84 extends around the cylinder 38 and carries a resilient sleeve 88 of a thermoplastic material such as Teflon or Nylon. An O-ring 90 of an elastomeric material is trapped between the end of sleeve 88 and a ring member 92 secured to the cylinder 38 to provide a fluid seal for chamber 52.

On impact of bumper assembly 42 the inner cylinder telescopes into the outer cylinder and the orifice 68 rides on the metering pin 70. Any axial misalignment between the pin and the orifice will cause the pin to float to a position precisely aligned with the orifice. As the inner cylinder strokes rearwardly, the orifice progressively restricts the flow from the chamber 48 into chamber 46 to absorb the impact energy. During this time the chamber 46 expands compressing the gas in chamber 58 to store sufficient return energy therein to move the cylinders from their FIG. 3 to their FIG. 2 position when the impact force is removed.

Figure 4:
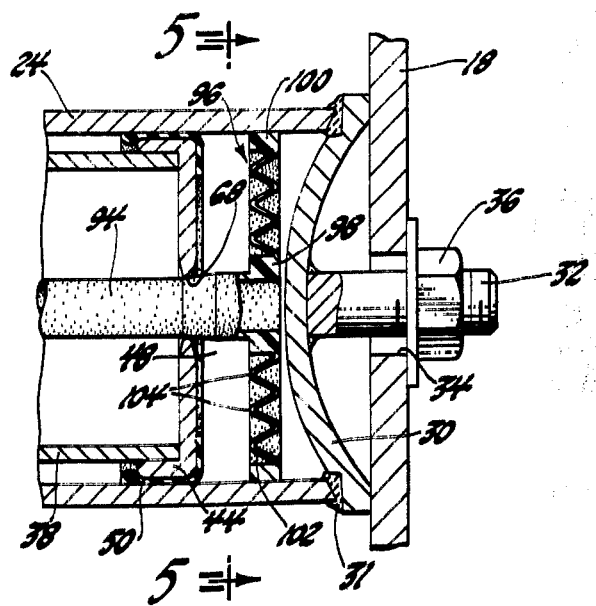
FIG. 4 is a cross-sectional view of a portion of another embodiment of the invention.
Figure 5:
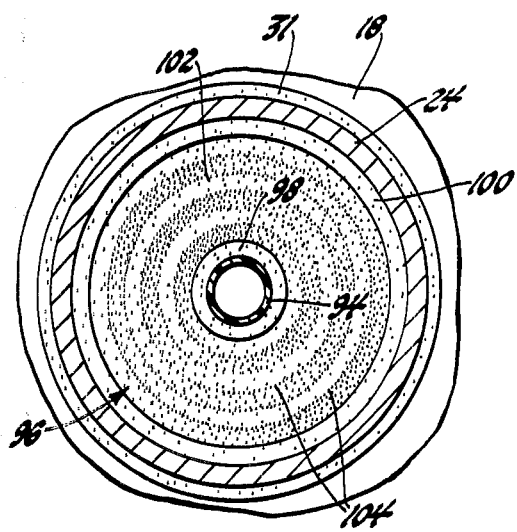
FIG. 5 is a view taken along lines 5—5 of FIG. 4.

In a second embodiment of the invention illustrated in FIGS. 4 and 5, there is a metering pin 94 which corresponds to the pin 70 of the first embodiment and is radially adjustable with respect to a fixed oil metering orifice such as orifice 68. Metering pin 94 is a hollow tapering pin which has an integral base member 96. The pin and its base member form a unit molded from a suitable plastic material. This pin extends axially in the energy absorber unit and is supported by the base member 96. The base is formed with inner and outer support rings 98 and 100 joined by a thin wall portion 102 having concentric corrugations 104. The support rings 100 may be secured to the outer cylinder 24 if desired. The flexible support provided by the corrugated thin wall section 102 of the base member permits the radial adjustment of the pin relative to the fixed orifice 68 for the proper alignment of these two components during operation of the energy absorbing unit.

In the first embodiment of the invention the flash shield 76 retains the metering rod in the end of cylinder 24 as well as cooperating with the base 72 of the metering rod to prevent flash from weld 31 from entering into chamber 48. In the second embodiment the base member 96 provides this function. In both embodiments the metering rods are molded from a suitable plastic material providing substantial weight reduction and eliminating the prior metallic metering rods and the welded connection of such pins to their associated end caps. With the preferred constructions illustrated and described above the prior separate radially adjustable metering orifice is replaced by a fixed orifice which is formed by a central opening in cylinder cap 44.

While preferred embodiments of this invention have been shown and illustrated, other embodiments and changes will now become obvious to those skilled in the art. Accordingly, the scope of this invention is set forth by the following claims.

I claim:

1. An impact energy absorber unit for mounting a bumper assembly to a vehicle body structure comprising first and second cylinders providing first and second fluid chambers therein, support means mounting said first cylinder for telescoping movement with respect to said second cylinder between an extended position and a retracted position, said first cylinder having a cap secured to one end thereof, said cap dividing said cylinders into first and second hydraulic chambers, each of said chambers having oil therein, said cap having a fixed centralized orifice formed therein providing hydraulic communication between said chambers, an elongated metering rod projecting into said orifice and extending longitudinally in said unit, an annular support disc secured to the interior cylindrical wall of said second cylinder adjacent to one end thereof, said support disc having an enlarged central opening therethrough, said metering rod extending through said central opening, said metering rod having an enlarged base member integral therewith which directly covers said central opening, said central opening providing clearance for said metering rod to allow said metering rod to adjust radially with respect to said orifice to meter a predetermined flow of oil from said first chamber to said second chamber in response to the telescoping movement of said first cylinder into said second cylinder.

2. An impact energy absorber unit for mounting a bumper assembly to a vehicle body structure comprising first and second cylinders, support means mounting said first cylinder for telescoping movement with respect to said second cylinder between an extended position and a retracted position, said first cylinder having a cap secured to one end thereof, said cap dividing said cylinders into first and second hydraulic chambers, each of said chambers having a fixed central orifice providing hydraulic communication between said chambers, a molded metering rod of plastic material extending longitudinally in said unit and having one end disposed within said central orifice, a flash shield disposed in said second cylinder, a base plate secured to the other end of said metering pin disposed behind said flash shield, said flash shield having an enlarged central opening therein through which said metering rod extends, said opening being sized to permit said rod to be radially adjusted and aligned with said orifice so that said metering rod and orifice can cooperate to meter fluid from said first chamber into said second chamber in response to the telescoping movement of said cylinders to absorb impact energy applied to said bumper assembly.

3. An impact energy absorber unit for mounting a vehicle bumper assembly to a vehicle body structure separate from said bumper assembly comprising first and second cylinders, support means mounting said first cylinder for telescoping movement with respect to said second cylinder between an extended position and a retracted position, said first cylinder having a cap secured to one end thereof, said cap dividing said first and second cylinders into first and second hydraulic chambers, each of said chambers having a hydraulic fluid therein, said cap having a fixed central orifice formed directly therethrough providing communication between said chambers, an elongated metering rod of molded plastic material extending in said unit and having a free end extending into said orifice, an annular base member integral with the other end of said rod, said base member having an outer ring portion peripherally engaging the inside wall of said second cylinder and an annular thin walled portion connecting said outer ring portion to said other end of said rod to permit said rod to radially adjust with respect to said orifice to permit the free end of said rod to coact and progressively restrict said orifice to meter fluid from said first chamber into said second chamber to absorb impact energy applied to said bumper assembly in response to the telescoping of said first cylinder into said second cylinder.

4. An impact energy absorber unit according to claim 3 in which said yieldable means is centrally connected to said pin and has a thin wall section of corrugated flexible material to permit the radial adjustment of said rod relative to said fixed central orifice.

* * * * *

UNITED STATES PATENT AND TRADEMARK OFFICE
CERTIFICATE OF CORRECTION

PATENT NO. : 3,887,224
DATED : June 3, 1975
INVENTOR(S) : Frank H. Browne

It is certified that error appears in the above-identified patent and that said Letters Patent are hereby corrected as shown below:

The title on the title page and on page 1, column 1, should be changed from "IMPACT ENERGY ABSORBER WITH RADIALLY ADJUSTABLE FLOW METERING" to -- IMPACT ENERGY ABSORBER WITH RADIALLY ADJUSTABLE FLOW METERING PIN --.

Column 1, line 46, "and" should be -- the --.

Signed and Sealed this twenty-eight Day of October 1975

[SEAL]

Attest:

RUTH C. MASON
Attesting Officer

C. MARSHALL DANN
Commissioner of Patents and Trademarks